March 9, 1937.  W. SOMONDSON  2,073,569
LIQUID SPRAYER
Filed Nov. 12, 1935

William Somondson
INVENTOR
BY Victor J. Evans & Co.
ATTORNEY

Patented Mar. 9, 1937

2,073,569

UNITED STATES PATENT OFFICE 2,073,569

LIQUID SPRAYER

William Somondson, Thief River Falls, Minn.

Application November 12, 1935, Serial No. 49,404

1 Claim. (Cl. 299—63)

The invention relates to a liquid sprayer and more especially to a plant sprayer.

The primary object of the invention is the provision of a sprayer of this character, wherein liquid of a poisonous kind can be conveniently sprinkled or sprayed onto growing plants so as to kill insects and other pests of this nature which destroy the life of such plants, the sprayer being of novel construction so that it can be worn upon the person and manually operated.

Another object of the invention is the provision of a sprayer of this character, wherein a quantity of poisonous liquid is held within a container and such liquid delivered in the path of a bladed wheel which causes the spraying of the liquid onto plants to exterminate or destroy insects or the like, such as potato bugs or other pests, the bladed wheel being driven manually.

A further object of the invention is the provision of a sprayer of this character, which is simple in construction, thoroughly reliable and efficient for the purposes intended thereof, readily and easily transported, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
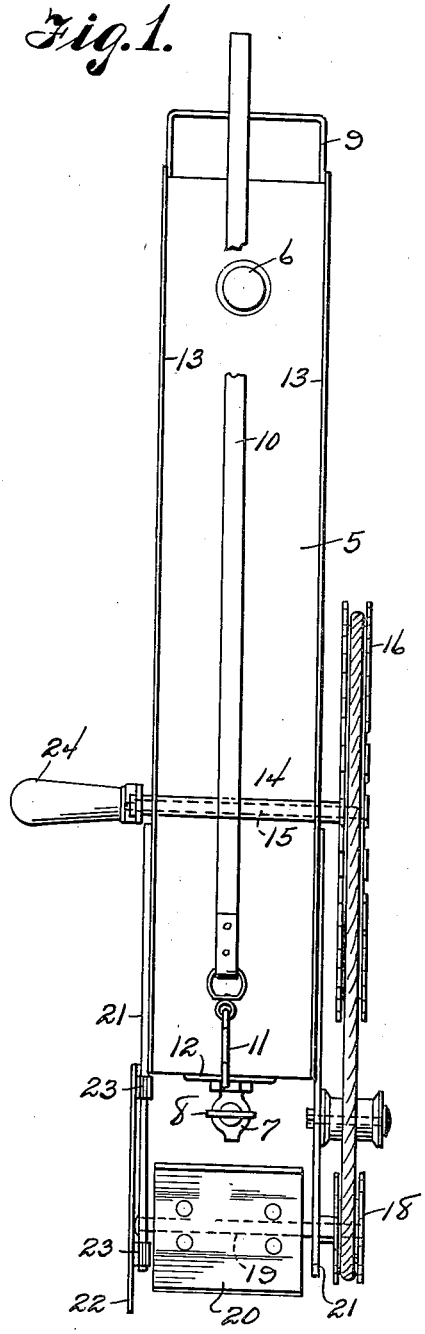
Figure 1 is a plan view of a sprayer constructed in accordance with the invention.
Figure 2:
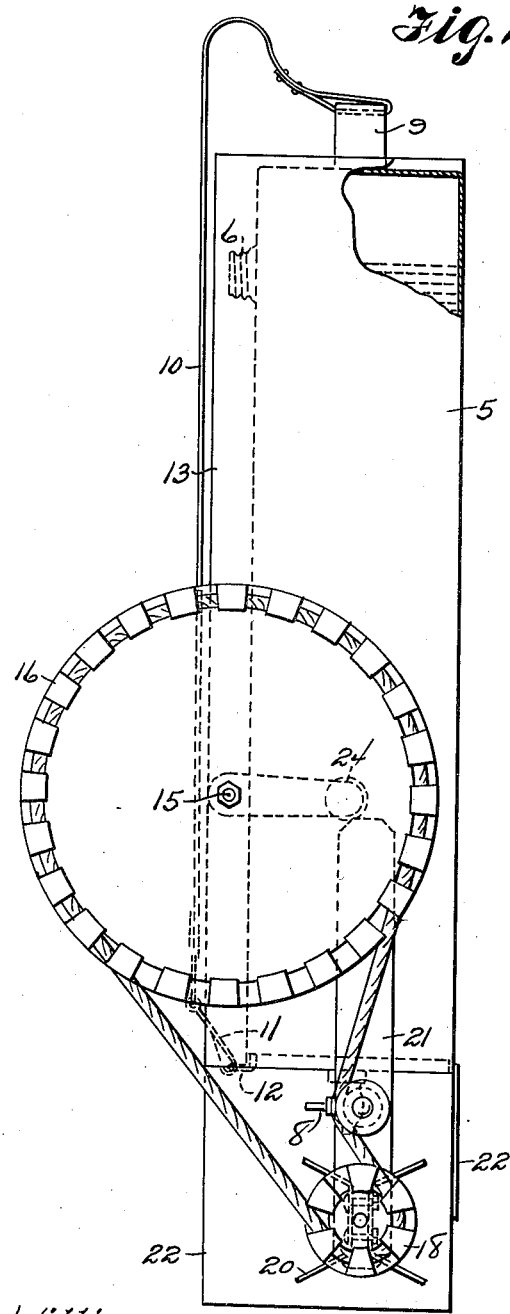
Figure 2 is a side elevation thereof, the same being partly broken away.

Referring to the drawing in detail, the sprayer comprises a liquid receiving tank 5, preferably of elongated rectangular shape in cross section having at one side a capped filling mouth 6 so that poisonous liquid can be introduced into the tank 5 for the filling thereof and such liquid is of a kind to kill insects or other pests, such as potato bugs or the like, the liquid being dispensed or sprayed when delivered from the tank in a manner presently described. At one end of the tank 5 is arranged a valved outlet nipple, spout or faucet 7, the valve 8 of which is of the plug hand turning type for the opening and closing of said nipple, spout or faucet. At the other end of the tank 5 is a loop handle 9 to which is loosely connected a flexible shoulder strap 10 carrying a snap hook 11 for detachable engagement with an eye 12 at the end carrying the nipple, spout or faucet 7 so that the strap 10 when attached as before mentioned to the tank 5 can be hung or suspended from the shoulder of a person for the carriage thereof in the use of the sprayer, it being preferable to have the tank suspended or hung from the left shoulder of such person.

At opposite sides of the tank 5 are plates 13, these being extended above the side carrying the filling mouth 6 to provide flanges having united therewith an axle sleeve 14 which is disposed transversely or crosswise of the tank 5 and accommodates an axle 15 for a driving belt wheel 16 over which is trained an endless belt, the same being also trained over a pulley 18 fitted to the arbor 19 of a bladed sprayer wheel 20, the arbor 19 being journaled in bracket arms 21 fixed to the plates 13 and projected the required distance beyond the end of the tank 5 having the nipple, faucet or spout 7.

Engageable with one of the brackets 21 is a shield piece 22 which extends about two sides of the wheel 20, the said shield 22 being separably fitted by hooks 23 to its bracket 21.

In the operation of the sprayer when the tank 5 is filled the liquid will flow therefrom through the nipple, spout or faucet 7 and by the manual turning of the wheel 20 the said liquid will be sprayed or sprinkled onto plants for destroying insects or other like pests thereon, the liquid being of a poisonous kind, as for example, a mixture of water and Paris Green. The flow of the liquid is controlled by the valve 8 and the wheel 20 is manually driven through a hand crank 24 attached to the axle 15 at the right hand side of said tank, the strap 10 being for the purpose of hanging the sprayer upon the shoulder of a person so that it may be conveniently carried and operated while so carried.

What is claimed is:

A device of the character described comprising an elongated tank and having flanges extending beyond one longer side thereof, a bracket arm secured to each flange and extended beyond one end thereof, a valved faucet on said tank between the brackets for delivering a liquid therefrom, a bladed sprayer wheel between said brackets and having an axle journaled therein to locate the said wheel in confronting relation to the faucet, a belt wheel having an axle journaled in said flanges for locating the said belt wheel at one side of the tank, a belt pulley fixed to the axle of the said bladed wheel in alignment with the belt wheel, an endless belt trained over the belt wheel and said pulley, and a shield plate having hooked engagement with one of the brackets for disposing the said shield beyond one end of the bladed wheel on the side thereof opposite the said pulley.

WILLIAM SOMONDSON.